Oct. 31, 1933.  C. PENHALIGEN  1,932,474

BAKER'S PEEL

Filed July 25, 1932

INVENTOR
Charles Penhaligen
BY
Thomas Griswold Jr.
ATTORNEY

Patented Oct. 31, 1933

1,932,474

UNITED STATES PATENT OFFICE 1,932,474

BAKER'S PEEL

Charles Penhaligen, Midland, Mich.

Application July 25, 1932. Serial No. 624,445

3 Claims. (Cl. 107—67)

The present invention relates to improvements in baker's peels, which are implements for inserting in and removing from ovens the ordinary bakery products; and particularly regards an improved peel constructed of magnesium or alloys thereof wherein the magnesium content predominates.

I am aware that baker's peels have been constructed in a multiplicity of forms and from a large number of materials. It is, however, well recognized by those versed in the baking art that no satisfactory peel has heretofore been fabricated of any material other than wood, and, that wood peels are themselves not wholly satisfactory, due to the extremely short life thereof caused by burning, warping, and splitting. Such metal peels as have been made have possessed the disadvantages, in contrast with a wood peel, of: (1) seizing the metal of the baking pans imperfectly; (2) damaging the metal pans, due to having a much higher hardness factor; (3) being heavier than a wood peel; (4) requiring occasional tooling to maintain a sharp forward edge; etc. In fact, although inventors have been working on the problem for more than fifteen years, no metal peel has been produced which has found general acceptance among bakers.

It is, therefore, an object of this invention to provide a metal baker's peel which is free of the foregoing difficulties, which can be manufactured at a low cost, which will have an exceptionally long life, and which will possess properties rendering it efficient in use.

To the accomplishment of the foregoing and related ends, the invention, then, consists of the means hereinafter fully described and particularly pointed out in the claims, the annexed drawing and the following description setting forth in detail certain means for carrying out the invention, such disclosed means, illustrating, however, but several of the various ways in which the principle of the invention may be used.

In said annexed drawing:—

I have found that magnesium possesses certain peculiar physical properties when at the temperatures normally encountered in commercial bake ovens which properties have not been heretofore known. I now utilize the foregoing discovery by constructing a baker's peel from magnesium whereby my new discovery is embodied in a novel, useful article of manufacture. The aforementioned properties may be best described as: (1) a "stickiness" factor which enables the magnesium peel to seize the metal bread pans perfectly, thus facilitating the handling thereof; (2) the ability to "velvet" under oven heat, meaning that the point or forward end of the peel becomes softer than the metal of the pans, thus preventing damage to the metal bread pans; and (3) the property of wearing back evenly over the entire width of the peel, thus eliminating the necessity of sharpening the peel.

Figures 1, 2:
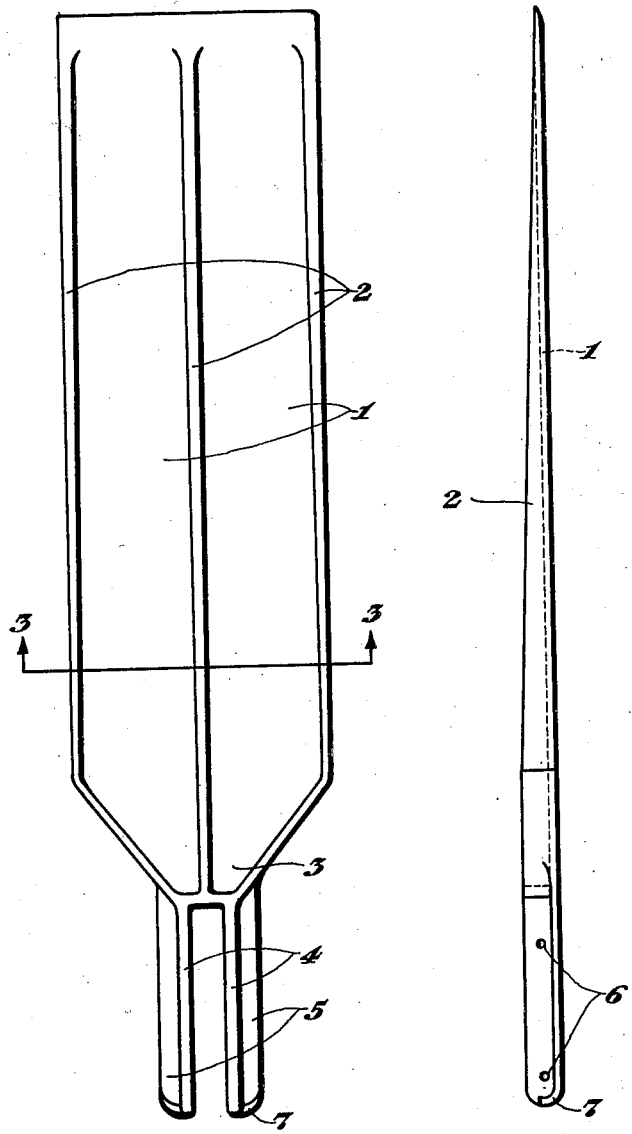
Figure 1 is a bottom plan view of the peel embodying certain structural features of my invention.
Figure 2 is a side elevational view of the peel shown in Figure 1.
Figure 3:
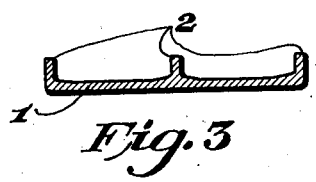
Figure 3 is a cross-section on the line 3—3 of Figure 1.

Referring now to the drawing showing a specific embodiment of my invention, i. e. a magnesium baker's peel formed in a single piece by casting, the main plate or blade 1, having a flat smooth top surface its entire length as shown in Figure 2, has a plurality of longitudinal runners 2 spaced thereon as shown in Figure 1. Figure 3 is a typical section through the peel showing the foregoing blade and runners. It will be noted from Figure 2 that the said runners 2 taper gradually from a substantial thickness at the rear to the thickness of the plate at the forward end thereof. As seen in Figure 1 the plate 1 is narrowed in width at the rear end 3 thereof, and the runners are then joined together. A bifurcated extension 4 of the runners 2 projects back over a bifurcated extension 5 of the plate 1, holes 6 are drilled through the extension 4 of the runners, whereby the elements 4, 5 and 6 form a socket member adapted to engage a peel pole constructed in the regular manner of any suitable material. The extreme rear end 7 of the bifurcated extension 5 is curved to prevent the possibility of the end pan in a series of pans strapped together catching on the rear end of the peel and hampering withdrawal thereof from beneath the pans.

Among the advantages which inhere to my improved baker's peel are: (1) It seizes the metal pans perfectly; (2) it has an exceedingly long life; (3) it does not damage the pans during handling thereof; (4) it is sanitary in every respect; (5) it can be constructed in a single piece at a very low cost; (6) it is very light, even lighter than a wood peel of comparable dimension; and (7) it wears evenly thereby maintaining its initial wedge-like form and point.

While I have shown a peel of one piece construction made by casting the metal in a mold, I have constructed and used peels built up of a separate plate and runners secured together by riveting or spot welding. Such peels also gave satisfactory results in use and presented the same advantages over previous peels as does my cast magnesium peel. Instead of casting it is obvious that the article may be fabricated by pressing, forging, or in any other suitable manner. The use of my novel peel in ovens other than baker's ovens, wherein similar conditions of temperature prevail, is also contemplated.

The term "magnesium" as used herein and in the appended claims may be taken to mean not only elemental magnesium but also alloys thereof wherein the magnesium content predominates.

Other modes of applying the principle of my invention may be employed instead of the one explained, change being made as regards the apparatus herein disclosed, provided the means stated by any of the following claims or the equivalent of such stated means be employed.

I therefore particularly point out and distinctly claim as my invention:—

1. As a new article of manufacture, a baker's peel of magnesium metal.

2. As a new article of manufacture, a baker's peel formed of one piece of magnesium metal.

3. A baker's peel composed of magnesium metal in the shape of a flat plate and having runners tapering from the tip end of the plate or blade to a suitable thickness in the pole end thereof and a pole socket formed by a narrow bifurcated extension of said blade and the extension of two of such runners.

CHARLES PENHALIGEN.